(12) United States Patent
Goulier et al.

(10) Patent No.: US 12,039,092 B2
(45) Date of Patent: Jul. 16, 2024

(54) CURRENT SIGNATURE JAMMER OF AN INTEGRATED CIRCUIT

(71) Applicants: STMicroelectronics France, Montrouge (FR); STMicroelectronics (Alps) SAS, Grenoble (FR)

(72) Inventors: Julien Goulier, Grenoble (FR); Pascal Bernon, St-Hilaire-du-rosier Marcellin (FR)

(73) Assignees: STMicroelectronics France, Montrouge (FR); STMicroelectronics (Alps) SAS, Grenoble (FR)

( * ) Notice: Subject to any disclaimer, the term of this patent is extended or adjusted under 35 U.S.C. 154(b) by 314 days.

(21) Appl. No.: 17/544,038

(22) Filed: Dec. 7, 2021

(65) Prior Publication Data

US 2022/0180004 A1  Jun. 9, 2022

(30) Foreign Application Priority Data

Dec. 8, 2020  (FR) ...................................... 2012873

(51) Int. Cl.
*G06F 21/75* (2013.01)
*H03K 3/037* (2006.01)
*H03K 3/84* (2006.01)

(52) U.S. Cl.
CPC ........... *G06F 21/755* (2017.08); *H03K 3/037* (2013.01); *H03K 3/84* (2013.01)

(58) Field of Classification Search
CPC ......... G06F 21/755; H03K 3/037; H03K 3/84
USPC ...................................................... 726/22
See application file for complete search history.

(56) References Cited

U.S. PATENT DOCUMENTS

| | | | |
|---|---|---|---|
| 6,698,662 B1 | 3/2004 | Feyt et al. | |
| 7,571,492 B2 | 8/2009 | Hubert | |
| 7,599,488 B2 | 10/2009 | Kocher et al. | |
| 2019/0068074 A1* | 2/2019 | Feng | H03K 4/08 |
| 2022/0200583 A1* | 6/2022 | Gruber | H03F 3/2175 |
| 2023/0085939 A1* | 3/2023 | Wang | H03K 19/00369 |
| | | | 327/199 |

OTHER PUBLICATIONS

Vahedi, Haleh et al., "On-Chip Current Flattening Circuit with Dynamic Voltage Scaling," 2006 IEEE International Symposium on Circuits and Systems, May 21-24, 2006, 4 pages.

* cited by examiner

*Primary Examiner* — Kambiz Zand
*Assistant Examiner* — Phuc Pham
(74) *Attorney, Agent, or Firm* — Slater Matsil, LLP

(57) ABSTRACT

The present description concerns an integrated circuit including, between first and second terminals having a first voltage applied therebetween, a load configured to execute instructions, a circuit for delivering a digital signal having at least two bits from a binary signal and a current output digital-to-analog converter controlled by the digital signal and coupled between the first and second terminals in parallel with the load.

20 Claims, 5 Drawing Sheets

CURRENT SIGNATURE JAMMER OF AN INTEGRATED CIRCUIT

CROSS-REFERENCE TO RELATED APPLICATIONS

This application claims priority to French Patent Application No. FR 2012873 filed on Dec. 8, 2020, which application is hereby incorporated by reference herein in its entirety.

TECHNICAL FIELD

The present disclosure generally relates to integrated circuits and, in particular embodiments, to the protection of algorithms or digital data manipulated by an integrated circuit against possible attacks by analysis of the circuit power consumption.

BACKGROUND

The power consumption of an electronic circuit, particularly a data processing circuit, varies according to the activity of this circuit and more particularly to the executed calculations. When a circuit executes an activity that must remain secret or manipulate data or secret quantities, it is generally desired to avoid hacking by a third party by analyzing the circuit power consumption. Such hacking uses so-called Simple Power Analysis (SPA) or Differential Power Analysis (DPA) attacks, which examine the current signature of the circuit to discover the operation or the secret data thereof.

There exist methods aiming at preventing hacking by analysis of the circuit power consumption. A category of these methods includes disturbing the current signature of the circuit to make its examination more difficult.

An example of a method includes smoothing the current consumed by the circuit.

An example of a method includes adding to the current consumed by the circuit a current which varies randomly. [Dow] However, such methods may not provide sufficient protection against hacking by analysis of the circuit power consumption in some instances.

SUMMARY

Thus, an object of an embodiment is to overcome all or part of the disadvantages of the previously described integrated circuits.

Another object of an embodiment is for the integrated circuit to be configured to prevent hacking by analyzing the circuit power consumption.

For this purpose, an embodiment provides an integrated circuit comprising, between first and second terminals having a first voltage applied therebetween, a load configured to execute instructions, a circuit for supplying a digital signal having at least two bits from a binary signal, and a current output digital-to-analog converter controlled by the digital signal.

According to an embodiment, the digital-to-analog converter is coupled between the first and second terminals in parallel with the load.

According to an embodiment, the integrated circuit further includes, between the first and second terminals, a regulator configured to deliver a second voltage for the powering of the load from the first voltage, and the digital-to-analog converter being coupled between the first and second terminals in parallel with the load and the regulator.

According to an embodiment, the digital signal includes at least three bits.

According to an embodiment, the load is configured to deliver the binary signal.

According to an embodiment, the binary signal is a random signal.

According to an embodiment, the circuit for delivering the digital signal includes a succession of flip-flops rated by a clock signal, the input of the first flip-flop in succession receiving the binary signal, and the outputs of flip-flops in succession delivering the bits of the digital signal.

According to an embodiment, the succession includes a number of flip-flops greater than the number of bits of the digital signal.

According to an embodiment, the integrated circuit further includes a circuit configured to smooth the current consumed by the load.

An embodiment also provides a chip card with contacts or without contacts comprising the integrated circuit as previously defined.

An embodiment also provides a method of jamming the current signature of a load executing digital instructions located between first and second terminals having a first voltage applied therebetween, the method comprising the delivery of a digital signal having at least two bits from a binary signal and the delivery to the first terminal of a current by a current output digital-to-analog converter controlled by the digital signal.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail. In particular, the voltage regulation circuits and the current smoothing circuits are well known by those skilled in the art and have not been described in detail hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, the expressions "around," "approximately," "substantially," and "in the order of" signify within 10% and preferably within 5%. Further, a signal which alternates between a first constant state, for example, a low state, noted "0," and a second constant state, for example, a high state, noted "1," is called a "binary signal." The high and low states of different binary signals of the same electronic circuit may be different. In practice, the binary signals may correspond to voltages or currents that may not be perfectly constant in the high or low state. Further, the term digital signal designates a signal comprising at least two binary signals.

An example of application of the present disclosure is the field of chip cards and other electronic tags with or without contacts.

Figure 1:
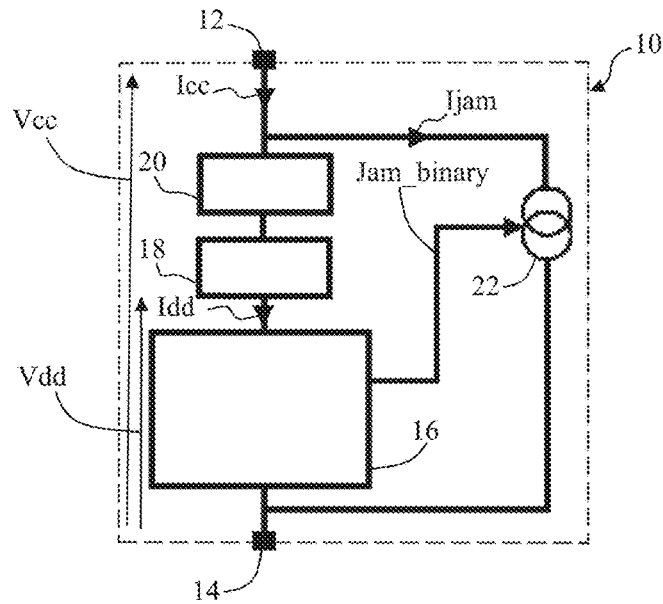
FIG. 1 is an electric diagram of an embodiment electronic chip.

FIG. 1 shows the electric diagram of an embodiment integrated circuit 10, also called an electronic chip. Integrated circuit 10 may correspond to a chip of a chip card with contacts or a chip of a contactless chip card.

Integrated circuit 10 includes terminals 12 and 14 having a voltage Vcc applied therebetween. Voltage Vcc is delivered by a system, for example, a card reader, coupled to the integrated circuit. Voltage Vcc may be a voltage directly delivered by a system connected to terminals 12 and 14.

In embodiments, integrated circuit 10 may form part of an electronic device, for example, a contactless chip card, and voltage Vcc may be delivered from a signal received by the electronic device when it is coupled to the system.

For example, voltage Vcc may be a substantially constant voltage obtained from an oscillating signal. Generally, voltage Vcc may vary according to the type of system coupled to the integrated circuit. As an example, voltage Vcc may vary from 1 V to 5 V.

Integrated circuit 10 includes a load 16 between terminals 12 and 14. Load 16, for example, includes a processor, microprocessor or a microcontroller.

The integrated circuit further includes a regulation circuit 18 for delivering, from voltage Vcc, a power supply voltage Vdd adapted to the operation of load 16. Regulation circuit 18 may be a linear regulation circuit, particularly a series-type regulation circuit or a shunt-type regulation circuit.

To jam the current signature of integrated circuit 10, integrated circuit 10 may include a smoothing circuit 20 configured to smooth the current Idd consumed by load 16.

In FIG. 1, load 16, regulation circuit 18, and smoothing circuit 20 are shown as being series-assembled between terminals 12 and 14. It should, however, be clear that the assembly of load 16, regulation circuit 18, and smoothing circuit 20 between terminals 12 and 14 depends on the structure of regulation circuit 18 and smoothing circuit 2. An example of a regulation circuit 18 and a smoothing circuit 20 is described in U.S. Pat. No. 9,678,525, which is incorporated herein by reference in its entirety.

To jam the current signature of integrated circuit 10, integrated circuit 10 may further include a jamming circuit 22. Jamming circuit 22 may be coupled between terminals 12 and 14, in parallel with load 16, with regulation circuit 18, and with smoothing circuit 20.

As an example, jamming circuit 22 corresponds to a current source controlled by a signal Jam_binary delivered by load 16. The current Icc flowing between terminals 12 and 14 is the sum of the current Idd powering the load 16 and the current Ijam delivered by jamming circuit 22.

Signal Jam_binary may be a binary signal controlling the jamming circuit 22 in all or nothing. For example, when signal Jam_binary is at "0," the current Ijam delivered by jamming circuit 22 is zero. When signal Jam_binary is at "1," the current Ijam equals a substantially constant maximum value Imax. According to an embodiment, new values of binary signal Jam_bit are delivered at the clock signal rate, not shown in FIG. 1. Preferably, signal Jam_binary is a random or pseudo-random signal.

Figure 2:
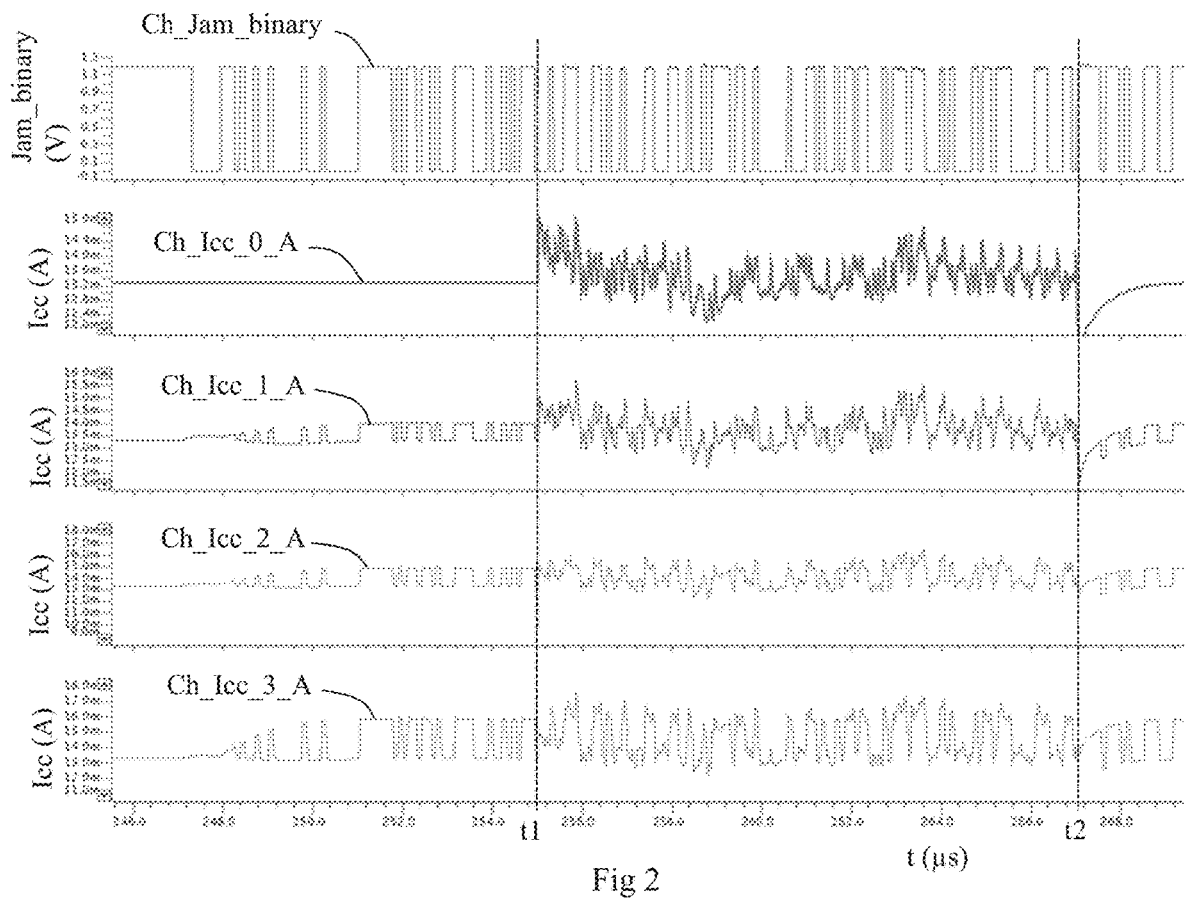
FIG. 2 are timing diagrams of signals of the embodiment electronic chip of FIG. 1 for a first voltage Vcc.
Figure 3:
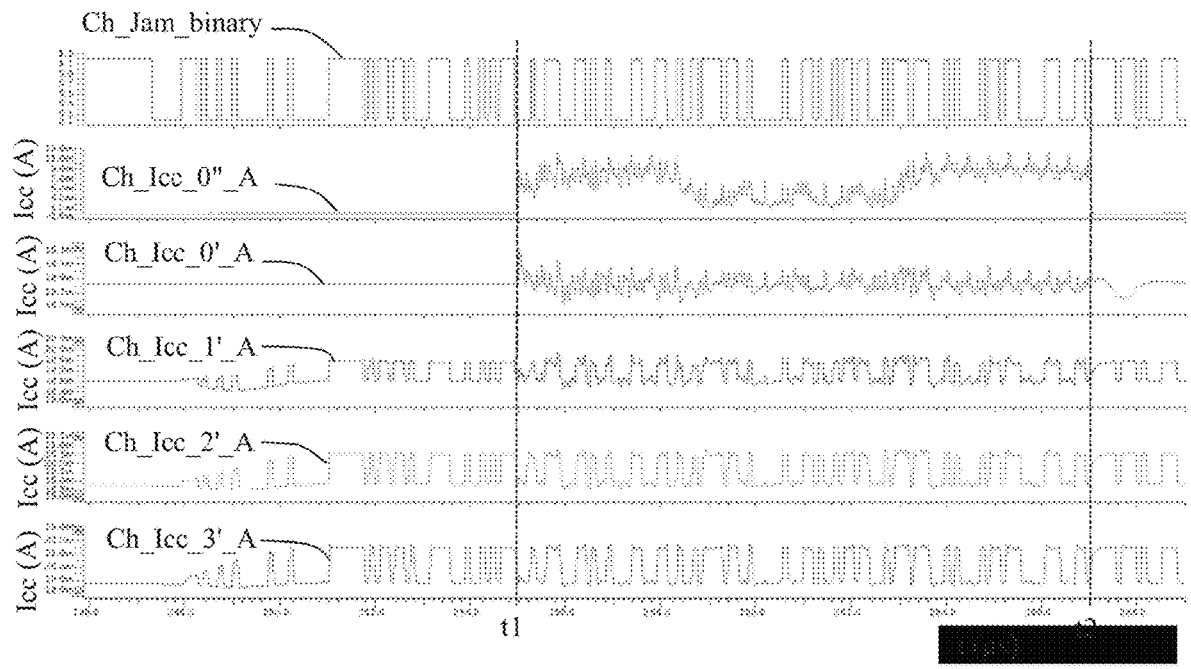
FIG. 3 are timing diagrams of signals of the embodiment electronic chip of FIG. 1 for a second voltage Vcc.

FIGS. 2 and 3 each show timing diagrams, obtained by simulation, Ch_Jam_binary, Ch_Ice_0_A, Ch_Ice_1_A, Ch_Ice_2_A, Ch_Icc_3_A, Ch_Ice_0'_A, Ch_Ice_0"_A, Ch_Ice_1'_A, Ch_Ice_2'_A, and Ch_Icc_3'_A of signals of integrated circuit 10. Load 16 is active between times t1 and t2.

For FIG. 2, voltage Vcc is equal to 2.2 V, while, for FIG. 3, voltage Vcc is equal to 5 V.

In FIGS. 2 and 3, the timing diagram Ch_Jam_binary is a timing diagram of the signal Jam_binary used for all the simulations. The other timing diagrams are timing diagrams of the current Icc at terminal 12.

For FIG. 2, for timing diagram Ch_Ice_0_A, smoothing circuit 20 is present, but the jamming circuit 22 is not present. For timing diagrams Ch_Ice_1_A, Ch_Ice_2_A, and Ch_Ice_3_A, smoothing circuit 20 is present, and jamming circuit 22 delivers a current Imax, respectively, equal to 0.75 mA, 1.5 mA, and 2.5 mA.

For FIG. 3, for timing diagram Ch_Ice_0"_A, smoothing circuit 20 and jamming circuit 22 are not present. For timing diagram Ch_Ice_0'_A, smoothing circuit 20 is present but the jamming circuit 22 is not present. For timing diagrams Ch_Ice_1'_A, Ch_Ice_2'_A, and Ch_Ice_3'_A, smoothing circuit 20 is present, and jamming circuit 22 delivers a current Imax respectively equal to 0.75 mA, 1.5 mA, and 2.5 mA.

Figure 4:
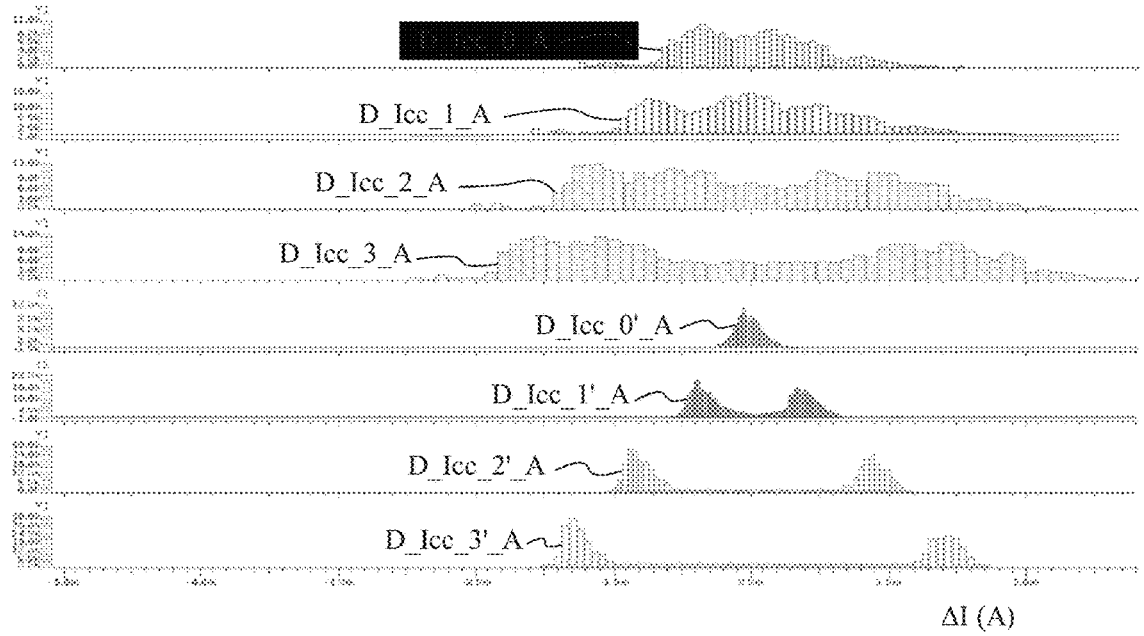
FIG. 4 are distributions of variations of signals of chronographs of FIGS. 2 and 3.

FIG. 4 shows distributions D_Ice_0_A, D_Ice_1_A, D_Ice_2_A, D_Ice_3_A, D_Ice_0'_A, D_Ice_1'_A, D_Ice_2'_A, and D_Ice_3'_A of the variation ΔI of the intensity of current Icc with respect to the average consumed current, respectively obtained for timing diagrams Ch_Ice_0_A, Ch_Ice_1_A, Ch_Ice_2_A, Ch_Ice_3_A, Ch_Ice_0'_A, Ch_Ice_1'_A, Ch_Ice_2'_A, and Ch_Ice_3'_A. A substantially constant distribution of current Icc reflects an efficient jamming, making the extraction of information from an analysis of the circuit power consumption difficult.

As shown in FIG. 2, when voltage Vcc is equal to 2.2 V, a current Imax equal to 0.75 mA is too low so that the timing diagram Ch_Ice_1_A of the current Icc obtained, while jamming circuit 22 is active, remains close to the timing diagram Ch_Ice_0_A of current Icc in the absence of jamming circuit 22. However, for timing diagrams Ch_Ice_2_A and Ch_Icc_3_A of FIG. 2, proper jamming is obtained with currents Imax, respectively, of 1.5 mA and 2.5 mA.

However, as shown in FIG. 3, when voltage Vcc is equal to 5 V, the values of current Imax of 1.5 mA and 2.5 mA are too high, so that the interference introduced by jamming circuit 22 appears on timing diagrams Ch_Ice_1'_A, Ch_Ice 2'_A, and Ch_Icc_3'_A and processing would allow with no excessive difficulty to subtract this interference. This also appears in FIG. 4, since distributions D_Ice_1'_A, D_Ice_2'_A et D_Ice_3'_A have two different portions separated an intermediate area with zero values, which is not true for distributions D_Ice_2_A and D_Ice_3_A. Thereby, determining the value of current Imax may be difficult to obtain efficient jamming for an extended range of voltage Vcc.

Figure 5:
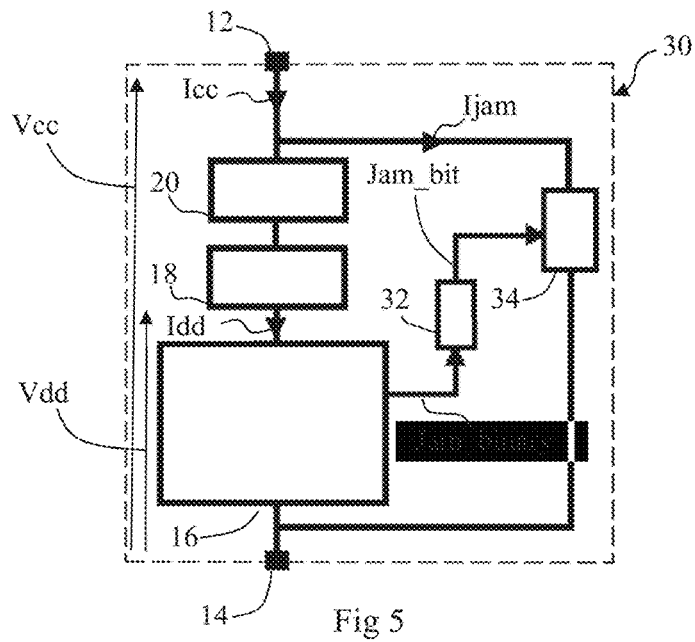
FIG. 5 is a diagram of an embodiment electronic chip.

FIG. 5 is an electric diagram of an embodiment of an integrated circuit 30. The integrated circuit includes all the elements of the integrated circuit 10 shown in FIG. 1, with the difference that jamming circuit 22 is replaced with a circuit 32 receiving binary signal Jam_binary and delivering a digital signal Jam_bit and a current output from digital-to-analog converter 34, controlled by digital signal Jam_bit.

Digital signal Jam_bit includes N bits, N being a natural integer greater than or equal to two, and preferably greater than or equal to three. According to an embodiment, each bit of digital signal Jam_bit varies randomly at the rate of a clock signal, not shown in FIG. 5.

According to an embodiment, digital-to-analog converter 34 is connected between terminals 12 and 14 and delivers current Ijam. Digital-to-analog converter 34 is configured to deliver $2^N$ different values for current Ijam. Current Ijam thus takes $2^N$ different values in time with a probability for each value which depends on digital signal Jam_bit.

According to an embodiment, each bit of digital signal Jam_bit varies randomly or pseudo-randomly at the rate of the clock signal. Current Ijam thus takes $2^N$ different values over time with, advantageously, a uniform probability for each value. The jamming function is thus improved. According to an embodiment, circuit 32 and digital-to-analog converter 34 are activated as soon as load 16 is active.

Figure 6:
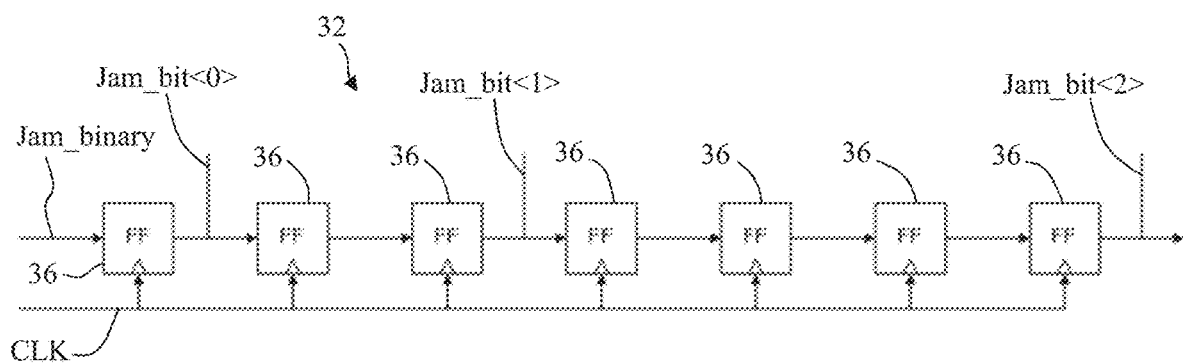
FIG. 6 is a diagram of a portion of the embodiment electronic chip of FIG. 5.

FIG. 6 is an electric diagram of an embodiment of circuit 32 in the case where N is equal to three. In the present embodiment, circuit 32 includes a succession of D-type flip-flops 36 (FF), 7 D-type flip-flops 36 being shown as an example in FIG. 6.

The first flip-flop 36 in succession receives binary signal Jam_binary on its data input. For each other flip-flop 36 in the succession of flip-flops 36, the input of the flip-flop is coupled to the output of the previous flip-flop in the succession of flip-flops.

Each flip-flop 36 is rated by a clock signal CLK. As an example, for each flip-flop 36, the value at the input of flip-flop 36 is copied on the output of flip-flop 36 at each rising edge of clock signal CLK.

Each of the bits of digital signal Jam_bit corresponds to the output of one of flip-flops 36. As an example, in FIG. 6, the least significant bit Jam_bit<0> corresponds to the output of the first flip-flop, the second bit Jam_bit<1> corresponds to the output of the third flip-flop, and the most significant bit Jam_bit<2> corresponds to the output of the last flip-flop.

In the present embodiment, the number of flip-flops 36 in the succession of flip-flops is equal to or greater than N.

Figure 7:
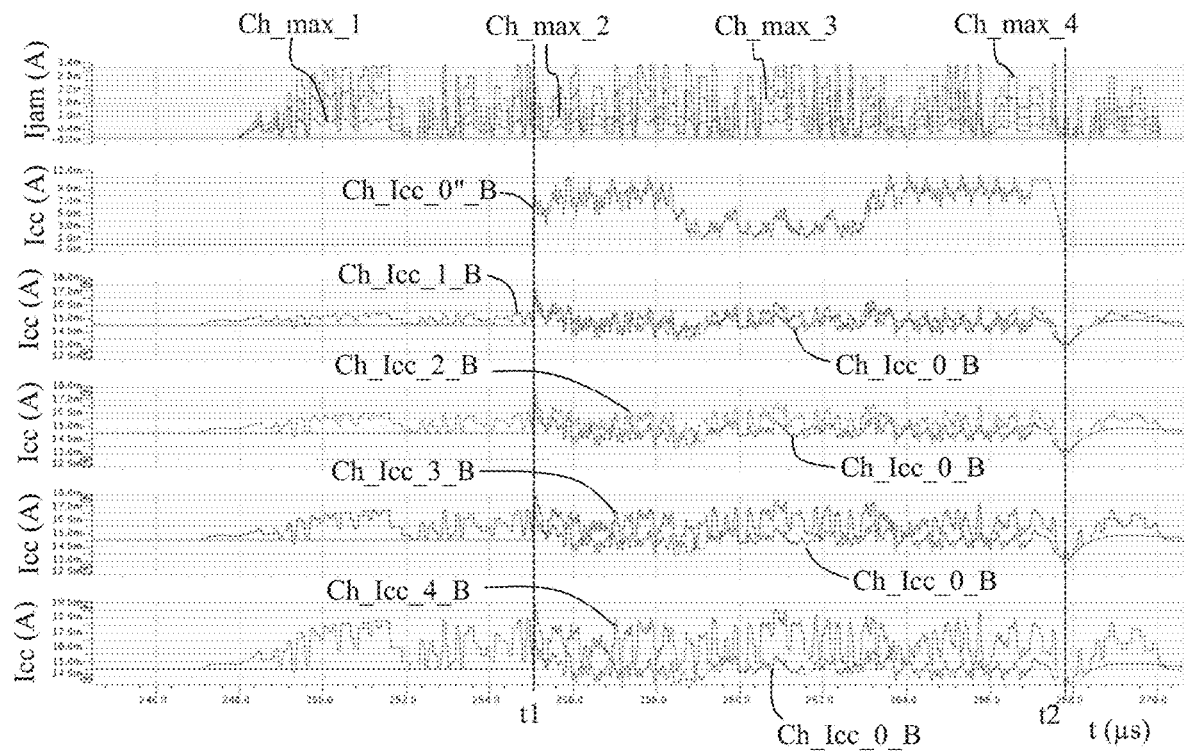
FIG. 7 are timing diagrams of signals of the embodiment electronic chip of FIG. 5 for a first voltage Vcc.
Figure 8:
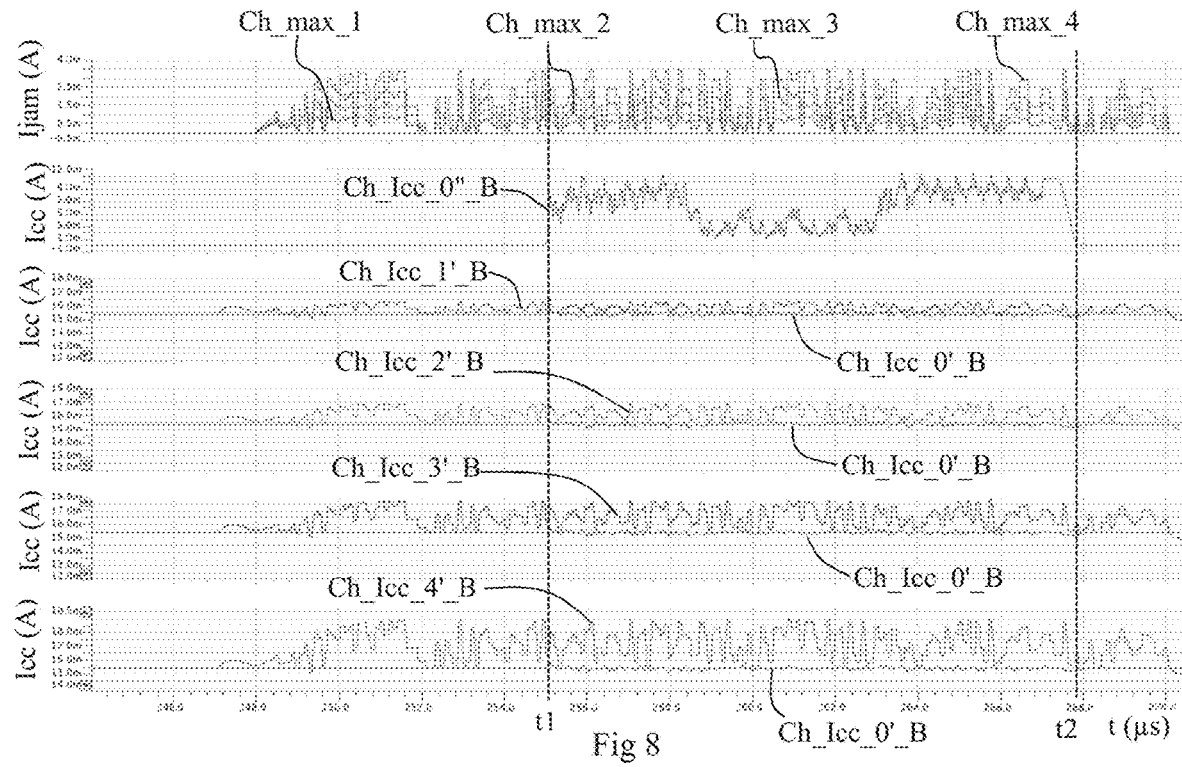
FIG. 8 are timing diagrams of signals of the embodiment electronic chip of FIG. 5 for a second voltage Vcc.

Simulations have been performed with the integrated circuit 30 shown in FIG. 5. FIGS. 7 and 8 each show timing diagrams, obtained by simulation, Ch_max_1, Ch_max_2, Ch_max_3, Ch_max_4, Ch_Ice_0_B, Ch_Ice_0'_B, Ch_Ice_1_B, Ch_Ice_2_B, Ch_Ice_3_B, Ch_Ice_4_B, Ch_Ice_1'_B, Ch_Ice_2'_B, Ch_Ice_3'_B, and Ch_Ice_4'_B of signals of integrated circuit 30. Load 16 is active between times t1 and t2.

For FIG. 7, voltage Vcc is equal to 2.2 V while, for FIG. 8, voltage Vcc is equal to 5 V. In FIGS. 7 and 8, timing diagrams Ch_max_1, Ch_max_2, Ch_max_3, Ch_max_4 are timing diagrams of current Ijam obtained for four increasing values of the maximum current capable of being supplied by digital-to-analog converter 34, and are used for all the simulations. The other timing diagrams are timing diagrams of current Ice at terminal 12. For FIGS. 7 and 8, for timing diagram Ch_Ice_0"_B, smoothing circuit 20 and circuit 32 are not present.

For FIG. 7, for timing diagram Ch_Ice_0_B, smoothing circuit 20 is present, but circuit 32 is not present. For timing diagrams Ch_Ice_1_B, Ch_Ice_2_B, Ch_Ice_3_B, et Ch_Ice_4_B, smoothing circuit 20 is present and jamming circuit 22 delivers a maximum current Imax respectively equal to 0.805 mA, 1.330 mA, 2.030 mA, and 3.045 mA.

For FIG. 8, for timing diagram Ch_Ice_0'_B, smoothing circuit 20 is present, but circuit 32 is not present. For timing diagrams Ch_Ice_1'_B, Ch_Ice_2'_B, Ch_Ice_3'_B, and Ch_Ice_4'_B, smoothing circuit 20 is present and circuit 32 delivers a maximum current Imax respectively equal to 0.805 mA, 1.330 mA, 2.030 mA, and 3.045 mA.

Figure 9:
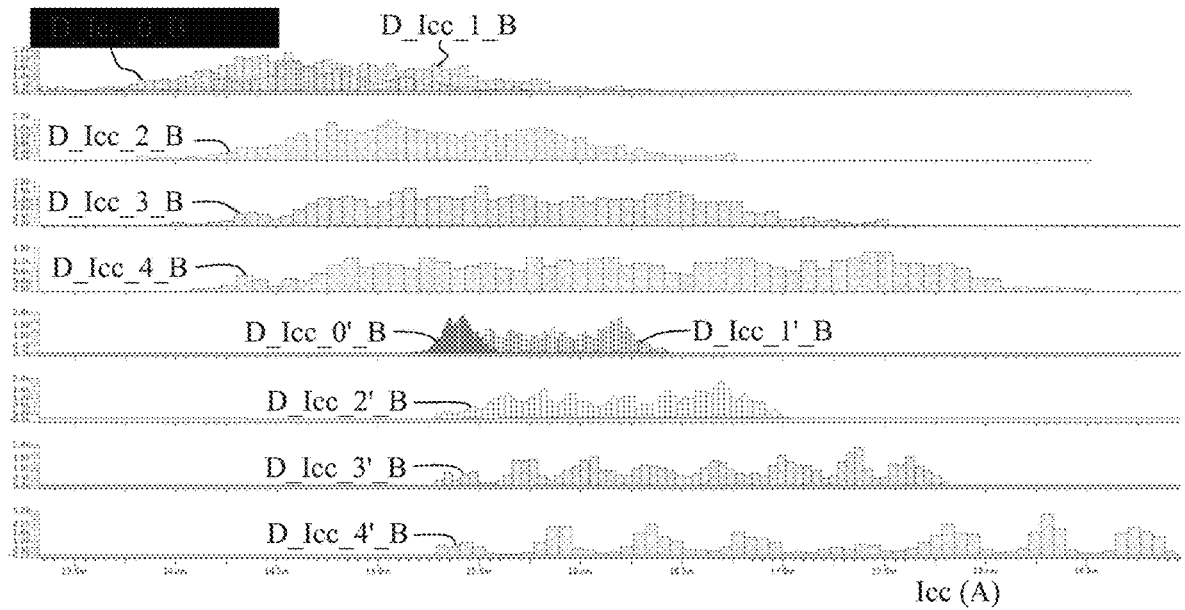
FIG. 9 are distributions of variations of signals of chronographs of FIGS. 7 and 8.

FIG. 9 shows distributions D_Ice_0_B, D_Ice_1_B, D_Ice_2_B, D_Icc3_B, D_Ice_4_B, D_Ice_0'_B, D_Ice_1'_B, D_Ice_2'_B, D_Icc3'_B, and D_Ice_4'_B of current Ice, respectively obtained for timing diagrams Ch_Ice_0_B, Ch_Ice_1_B, Ch_Ice_2_B, Ch_Ice_3_B, Ch_Ice_4_B, Ch_Ice_0'_B, Ch_Ice_1'_B, Ch_Ice_2'_B, Ch_Icc_3'_B, and Ch_Ice_3'_B.

As shown in FIGS. 7 to 9, efficient jamming is obtained for voltage Vcc equal to 2.2 V or 5 V, whatever the value of maximum current Imax. Thereby, the selection of the value of current Imax during the calibration of integrated circuit 30 is facilitated.

Over an extended range of voltage Vcc, the jamming signal delivered by jamming circuit 22 is difficult to separate from the signature of the current of load 16. This decreases the risk of identifying the signature of the current of load 16 by analyzing the circuit power consumption. This thus improves the security of integrated circuit 30.

Jamming circuit 22 provides additional flexibility and simplifies selecting the intensity of maximum current Imax since it attenuates the need to maintain the smoothing performance independent from power supply voltage Vcc, from the process conditions, and the temperature variation.

Jamming circuit 30 has a simple structure and substantially does not require an additional silicon area with respect to integrated circuit 10.

Figure 10:
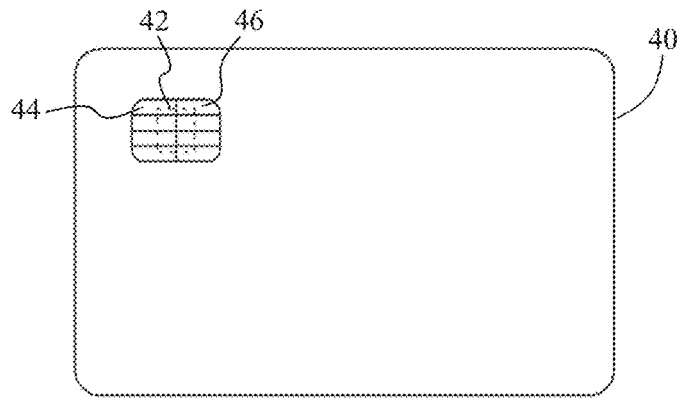
FIG. 10 is a schematic of an embodiment chip card with contacts.

FIG. 10 very schematically shows a card 40 with a chip 42 with contacts, where chip 42 may include the previously described integrated circuit 30. Card 40 is formed of a plate generally made of plastic material on which is placed a chip 42 accessible from the outside by electric contacts, among which at least two contacts 44 and 46 of application of a power supply voltage when the card is introduced into a reader.

Figure 11:
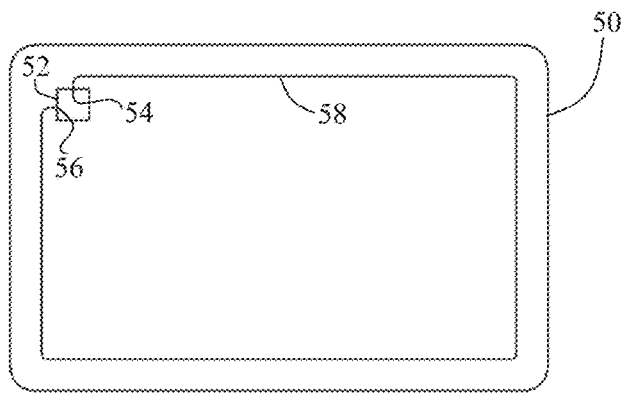
FIG. 11 is a schematic of an embodiment contactless chip card.

FIG. 11 shows a second example of a card 50 with a chip 52, where chip 52 may include the previously integrated circuit 30. It is a contactless card generally called an electromagnetic transponder. Card 50 includes the chip 52 having two input terminals 54 and 56 coupled to the two respective ends of a conductive track 58, supported by card 50 and forming an antenna. This antenna forms part of a resonant circuit of transponder 50 to capture not only information but also remote supply energy when the card is in the vicinity of a terminal generating an electromagnetic field.

The two systems with and without contacts may be present on the same card or even on the same chip.

Various embodiments and variants have been described. Those skilled in the art will understand that certain features of these various embodiments and variants may be combined, and other variants will occur to those skilled in the art. Finally, the practical implementation of the described embodiments and variations is within the abilities of those skilled in the art based on the functional indications given hereinabove.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An integrated circuit, comprising:
   a first terminal and a second terminal, wherein a first voltage is applied between the first terminal and the second terminal;
   a processor coupled between the first terminal and the second terminal, the processor configured to execute instructions and generate a first control signal of a binary kind;
   a jamming circuit configured to:
      receive the first control signal, and
      generate a second control signal based on the first control signal, the second control signal being a digital signal having N bits, where N is an integer equal to or greater than two; and
   a digital-to-analog converter configured to:
      receive the second control signal, and
      generate a jamming current based on the second control signal, the jamming current being a value between zero and a constant maximum current value and having $2^N$ number of possible values, and a current flowing from the first terminal to the second terminal being equal to a sum of a current draw from the processor and the jamming current.

2. The integrated circuit of claim 1, wherein the digital-to-analog converter is further coupled between the first terminal and the second terminal, and the digital-to-analog converter is arranged in parallel with the processor.

3. The integrated circuit of claim 1, wherein the processor comprises a power supply, the integrated circuit further comprising:
   a regulator coupled between the first terminal and the second terminal, the regulator configured to deliver a second voltage to the power supply based on the first voltage, and
   wherein the digital-to-analog converter is further coupled between the first terminal and the second terminal, and the digital-to-analog converter is coupled in parallel with the processor and the regulator.

4. The integrated circuit of claim 1, wherein N equals three.

5. The integrated circuit of claim 1, wherein the first control signal is a random signal.

6. The integrated circuit of claim 1, wherein the jamming circuit comprises:
   a plurality of flip-flops arranged in series, an operation of each flip-flop controlled by a clock signal, wherein a first flip-flop in the series is configured to receive the first control signal, and a last flip-flop in the series is configured to output the second control signal.

7. The integrated circuit of claim 6, wherein a quantity of the plurality of flip-flops is greater than N.

8. The integrated circuit of claim 1, further comprising a smoothing circuit configured to smooth the current consumed by the processor.

9. A method, comprising:
   having a processor for executing instructions, the processor coupled between a first terminal and a second terminal;
   applying a first voltage between the first terminal and the second terminal;
   generating, by the processor, a first control signal of a binary kind;
   generating, by a jamming circuit, a second control signal based on the first control signal, the second control signal being a digital signal having N bits, where N is an integer equal to or greater than two; and
   generating, by a digital-to-analog converter, a jamming current based on the second control signal, the jamming current being a value between zero and a constant maximum current value and having $2^N$ number of possible values, and a current flowing from the first terminal to the second terminal being equal to a sum of a current draw from the processor and the jamming current.

10. The method of claim 9, wherein the digital-to-analog converter is coupled between the first terminal and the second terminal, and the digital-to-analog converter is arranged in parallel with the processor.

11. The method of claim 9, further comprising:
   having a regulator coupled between the first terminal and the second terminal; and
   generating, by the regulator, a second voltage to a power supply of the processor, the second voltage based on the first voltage.

12. The method of claim 9, wherein N equals three.

13. The method of claim 9, wherein the first control signal is a random signal.

14. The method of claim 9, wherein the jamming circuit comprises:
   a plurality of flip-flops arranged in series, an operation of each flip-flop controlled by a clock signal, wherein a first flip-flop in the series is configured to receive the first control signal, and a last flip-flop in the series is configured to output the second control signal.

15. A system comprising an integrated circuit, the integrated circuit comprising:

a first terminal and a second terminal, wherein a first voltage is applied between the first terminal and the second terminal;

a processor coupled between the first terminal and the second terminal, the processor configured to execute instructions and generate a first control signal of a binary kind;

a jamming circuit configured to:
  receive the first control signal, and
  generate a second control signal based on the first control signal, the second control signal being a digital signal having N bits, where N is an integer equal to or greater than two; and a digital-to-analog converter configured to:
  receive the second control signal, and
  generate a jamming current based on the second control signal, the jamming current being a value between zero and a constant maximum current value and having $2^N$ number of possible values, and a current flowing from the first terminal to the second terminal being equal to a sum of a current draw from the processor and the jamming current.

16. The system of claim 15, wherein the digital-to-analog converter is further coupled between the first terminal and the second terminal, and the digital-to-analog converter is arranged in parallel with the processor.

17. The system of claim 15, wherein the processor comprises a power supply, the integrated circuit further comprising:
  a regulator coupled between the first terminal and the second terminal, the regulator configured to deliver a second voltage to the power supply based on the first voltage, and
  wherein the digital-to-analog converter is further coupled between the first terminal and the second terminal, and the digital-to-analog converter is coupled in parallel with the processor and the regulator.

18. The system of claim 15, wherein N equals three.

19. The system of claim 15, wherein the first control signal is a random signal.

20. The system of claim 15, wherein the jamming circuit comprises:
  a plurality of flip-flops arranged in series, an operation of each flip-flop controlled by a clock signal, wherein a first flip-flop in the series is configured to receive the first control signal, and a last flip-flop in the series is configured to output the second control signal.

* * * * *